Figure 1:
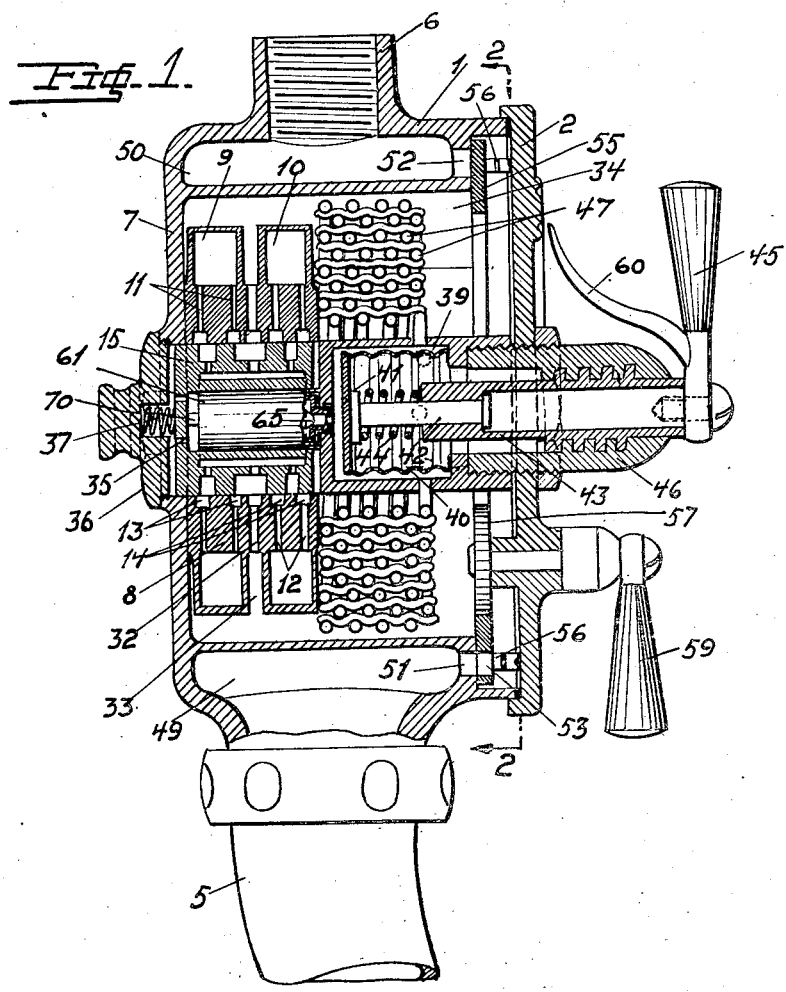

Nov. 30, 1943. J. F. HULTMAN 2,335,761
THERMOSTATIC MIXING VALVE
Filed Sept. 27, 1940 3 Sheets-Sheet 1

Inventor,
J. F. Hultman
By: Glascock Downing & Seebold
Attys.

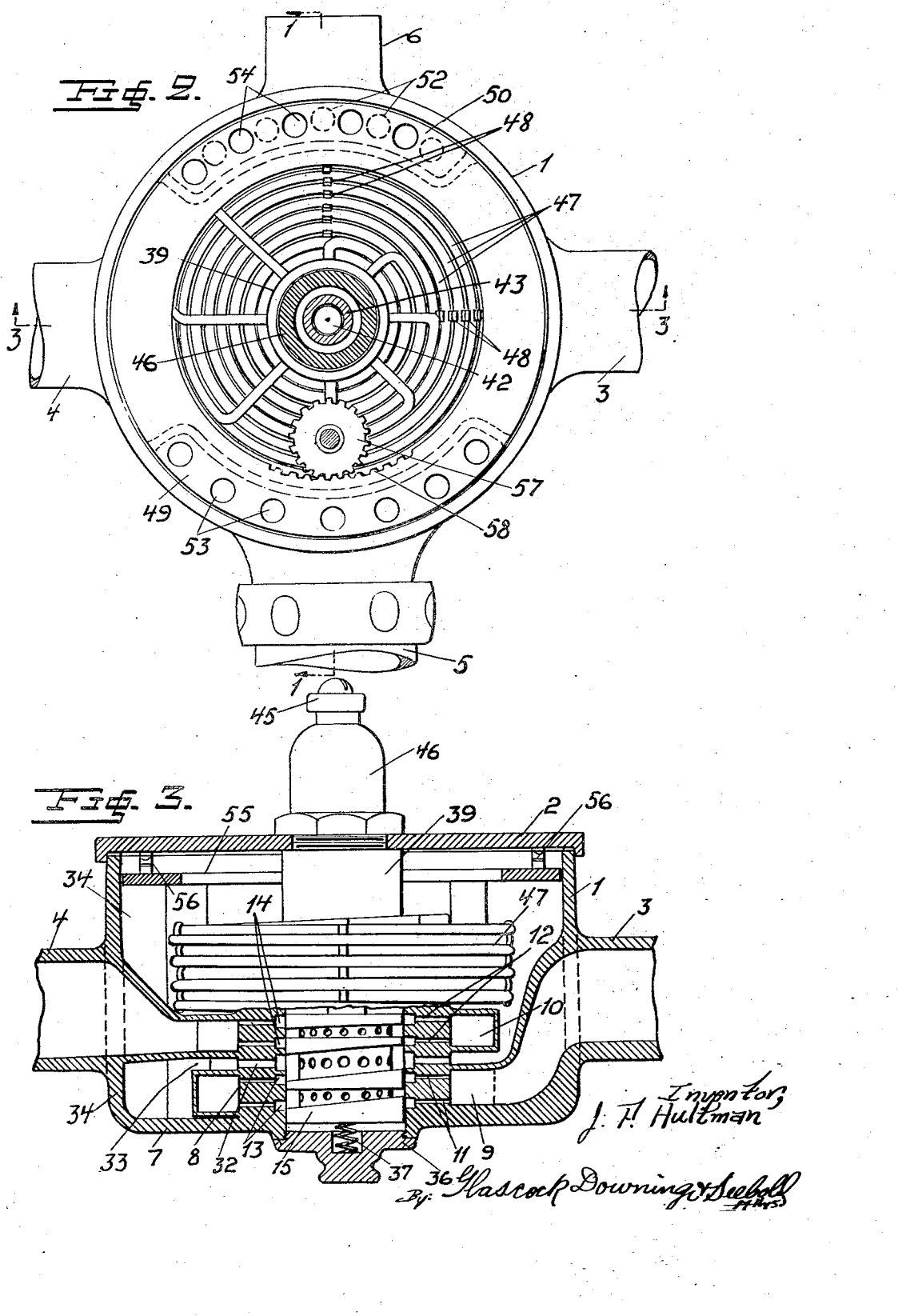

Nov. 30, 1943.    J. F. HULTMAN    2,335,761
THERMOSTATIC MIXING VALVE
Filed Sept. 27, 1940    3 Sheets-Sheet 3
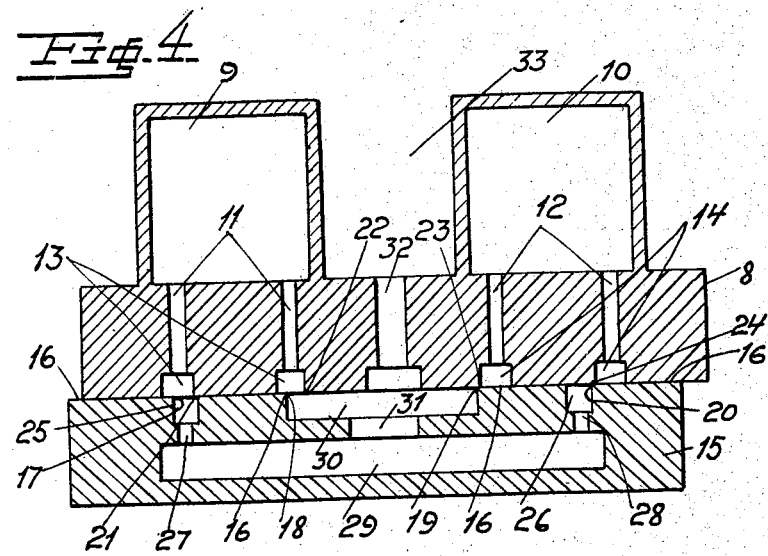
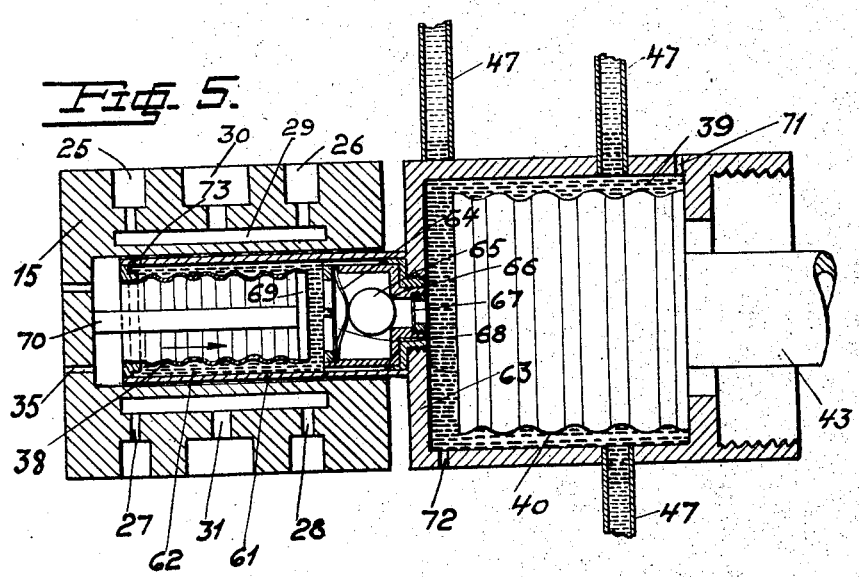
Inventor
J. F. Hultman
By: Glascock Downing Diebold Patented Nov. 30, 1943

2,335,761

UNITED STATES PATENT OFFICE 2,335,761

THERMOSTATIC MIXING VALVE

John Fritjof Hultman, Stora Angby, Sweden, assignor to Aktiebolaget Regulus, Stockholm, Sweden Application September 27, 1940, Serial No. 358,712 In Sweden July 8, 1938

4 Claims. (Cl. 236—12)

This invention relates to certain new and useful improvements in thermostatic mixing valves.

The invention relates more particularly to mixing valves, wherein a valve casing is provided with separate inlets for a hot and a cold medium, for instance hot and cold waters, and a mixing chamber for the media with a thermostatically operated valve controlling the entrance of the media to the mixing chamber with the thermostatic means located in the mixing chamber.

One object of the invention is to provide a mixing valve of the type described, which, independent of the temperatures of the two media to be mixed, will bring the mixing temperature of the media to the desired value and also be maintained constant.

A further object of the invention is to effect a sensitive and quick regulation of the mixing temperature to the desired value.

Another object of the invention is to prevent oscillations of the thermostatically operated valve.

In a preferred embodiment of the invention the thermostat is to be filled with two different liquids, one having a high viscosity, such as lubricating oil, and the other having a high degree of thermo-sensitivity, compared to the material of the container in which it is contained, such as kerosene.

In the annexed drawings one embodiment of a mixing valve according to the invention and adapted for bath-rooms is shown. Fig. 1 is a section along the line 1—1 of Fig. 2. Fig. 2 is a front view of the valve partly in section along the line 2—2 of Fig. 1, the front of the housing being removed. Fig. 3 is a section along the line 3—3 of Fig. 2. Fig. 4 is a detail view of a valve device on an enlarged scale. Fig. 5 is a detail view of the thermostatic device on an enlarged scale.

In the drawings, 1 designates the valve housing and 2 an associated lid. The valve housing is provided with an inlet 3 for cold water, an inlet 4 for hot water, an outlet 5 to the bath and an outlet 6 to the shower-bath.

Centrally disposed at the rear wall 7 of the valve housing 1 is a valve bushing 8, which is surrounded by two separate closed channels 9 and 10, respectively, the former one of which communicates with the cold water inlet 3 and the latter with the hot water inlet 4. Made in the valve bushing are two series of radially disposed and circumferentially spaced channels 11 and 12, respectively, the former ones of which communicate with the cold water channel 9 and also with each one of two annular recesses 13 at the inside of the valve bushing, whereas the latter channels 12 communicate in a similar manner with the hot water channel 10 and also with each one of two further annular recesses 14 at the inside of the valve bushing.

Axially displaceable in the valve bushing is a piston valve 15, which is provided with four axially spaced annular shoulders 16 corresponding to the number of recesses 13, 14 in the valve bushing and the inner edges 17, 18, 19 and 20 of which form regulating edges adapted to cooperate with corresponding regulating edges 21, 22, 23 and 24, respectively, in the valve bushing, as most clearly visible from Fig. 4. The two outer spaces 25, 26 between the shoulders communicate with an annular chamber 29 in the valve body, through a number of circumferentially spaced openings 27 and 28, respectively, whereas the central space 30 between the shoulders communicates with the said annular chamber 29 in the valve body through a series of circumferentially spaced openings 31 and also with the space 33 between the cold water and hot water channels 9 and 10 through a series of circumferentially spaced openings 32 in the valve bushing, said latter space 33 communicating directly with the mixing compartment 34 in the valve housing. The said inner regulating edges (17 to 20, Fig. 4) are obliquely directed, as visible from Fig. 3. The object of this arrangement is, when blocking the related inlet at the corresponding regulating edge (21 to 24) in the valve bore, to effect the said blocking gradually and smooth in order to prevent water shocks in the supply conduits. Obviously, for the same purpose the regulating edges 21 to 24 in the valve bushing instead may be obliquely directed. The valve body 15 is hollow and provided with openings 35 at the bottom in order to facilitate a free movement of the valve body. The valve bore is closed at its rear end by means of a screw lid 36, between which and the valve bottom there is placed a suitable pressure spring 37.

Placed inside the piston valve 15 is a sleeve 61, in which there is provided an outwardly open bellows 38 firmly and fluidtight connected at its outer end to the outer end of the sleeve and between which and the sleeve there is formed a chamber 62 adapted to be filled with a liquid having a relatively low heat conductivity and relatively high viscosity, such as lubricating oil. The inner end of the sleeve is firmly secured to the end wall 63 of a second chamber 39, which in the present case is to be filled with a liquid of the same quality as is the chamber 62. Secured to the said wall is a valve device, the valve body of which comprises a ball 65 acted on by a spring 64 and normally held pressed against its seat by the said spring. Provided at one place of the seat is a narrow channel 66, through which the chambers 39 and 62 permanently are in communication with each other. Provided at the inlet as well as at the outlet of the valve is a strainer 67 and 68, respectively. Firmly connected to the bottom plate 69 of the bellows 38 is a rod 70 actuating the piston valve 15 for movement in the direction from the right towards the left, while its movement in the opposite direction is effected by the spring 37.

In order to increase the susceptibility of the thermostat and thus to effect a quick regulation there is, in the embodiment shown, connected to the chamber 39 a number of mutually parallel connected coiled pipes 47, which are filled with liquid having a high coefficient of expansion, such as kerosene. The several pipe coils are somewhat spaced with relation to each other and the separate turns are held at a suitable distance from each other by means of interposed metal strips 48, so that the water entering the mixing compartment 34 will flush the pipe coils at all sides. Obviously, the said pipes, which preferably have a small diameter, so that a great number of them can be located within a restricted space, also can be arranged in any other manner than coiled, for instance in the form of radially disposed bundles or the like.

The filling of the thermostat, i. e. the chambers 39 and 62 and the pipes 47, with the two different liquids may be performed in the following manner.

Firstly, the whole thermostat that is to say, the chambers 38 and 62 and also the pipes 47 is filled with the liquid having the higher coefficient of expansion and is heated to for instance 85° C. Then a liquid having high viscosity is supplied through the opening 71, Fig. 5, until all of the first mentioned liquid has been discharged from the chambers 39 and 62 through the openings 72 and 73, the pipes 47 being still filled with the liquid having the higher heat conductivity. Then the thermostat is cooled for instance to 15° C. and all of the openings 71, 72 and 73 are closed. By the contraction occuring hereby the liquid having the lower heat conductivity and high viscosity also will fill up part of the room in the pipes 47. Thus the one thermostat chamber constituted by the chamber 62, is wholly filled by the liquid having the lower heat conductivity and high viscosity, whereas the second chamber, containing liquid of both kinds is formed partly by the chamber 39 and partly by the pipes 47.

In order to regulate the mixing temperature of the cold and hot water entering the mixing compartment 34 in the manner more clearly described below, the above mentioned chamber 39 shall be adjustable as to its volume, or in other words, the initial pressure in the chamber and in the bellows 38 communicating therewith must be variable.

To this end a bellows 40 is placed in the chamber 39, the interior of said bellows being wholly out of communication with the chamber, the volume of the chamber being changed, that is to say decreased or increased, by expanding or compressing the bellows 40, respectively. Bearing against the bottom of the bellows 40 is a plate 41 connected to a pin 42 axially movable in a screw spindle 43, a spring 44 being interposed between the said plate 41 and the inner end of the screw spindle and adapted to return the bellows 40 to a desired position under certain conditions, as will be described more clearly below. The screw spindle 43, which projects through the lid 2 outside the valve housing and is provided with a manoeuvring handle 45, is screwed into a bushing 46 firmly secured to the lid 2, the threading being such that upon turning the handle 45 in a counter-clockwise direction this will bring about an expansion of the regulating bellows 40 and thus a decrease of the volume of the chamber 39, whereas a turning in the opposite direction will cause an increase of the volume on account of the contraction of the bellows 40 proper and also due to the liquid pressure in the bellows 38, said latter bellows being acted on by the pressure spring 37.

In order to conduct the water to the bath or the shower-bath, respectively, the following means are provided. Made in the lower and upper part of the valve housing are pockets 49 and 50, respectively, communicating with the outlets 5 and 6, respectively. The said pockets may be put into communication with the mixing compartment 34 through series of ports 51 and 52, respectively, made in the end walls of the pockets facing the lid 2, said ports being controlled by an annular plate slide 55 rotatably mounted in the valve housing and bearing against the said end walls, series of ports 53 and 54, respectively, being made in the plate slide, which is held pressed against the said end walls by means of leaf springs 56 secured to the inside of the lid 2. The rotation of the slide 55 is effected by means of a pinion 57, the shaft of which is mounted in the lid 2 and which meshes with a toothed segment 58 on the inner circumference of the annular slide, a manoeuvring handle 59 being secured to the pinion shaft outside the lid. In the position of the slide 55 shown a communication is established between the mixing compartment 34 and the outlet 5 leading to the bath through the ports 53 and 51 registering with each other.

Connected to the maneuvering handle 45 of the thermostat is a pointer 60, which is set along a graduation made on the front side of the lid 2 in an impirical way.

The thermostat 38, 39, 47 is filled with the regulating liquid at a temperature corresponding to the lowest temperature, at which the valve is adapted to work, for instance 15° C.

The cold water may enter the mixing compartment of the valve in the following way, from the inlet 3, through the annular channel 9, the channels 11 in the valve bushing 8 and from there through the channels 27 in the piston valve, the chamber 29, the channels 31, the chamber 30, the channels 32 and the space 33 to the mixing compartment 34 and also directly from the inner series of channels 11 to the chamber 30 and through the channels 32 and the space 33 to the mixing compartment 34. The hot water may enter in a similar manner through the annular channel 10, the channels 12 in the valve bushing 8 and from there through the channels 28 and the chamber 29 in the piston valve, the channels 31, the chamber 30, the channels 32 and the space 33 and also directly from the inner series of channels 12 to the chamber 30, the channels 32 and the space 33 to the mixing compartment 34. It is obvious that, if the said cold and hot water ways be simultaneously open, a mingling of the cold and the hot water will take place in the piston valve device, that is to say in the chambers 29 and 30, which is of a great importance from the regulating point of view. From the same point of view it is also of importance that due to the valve construction shown the adjusting movements of the piston valve can be made small, since by such means there will be no risk of overstraining the material of the bellows 38. By the fact that the total volume of the intercommunicating chamber 39 and pipes 47 is large in comparison with the volume of the bellows 38, the adjustment will be sensitive and effected with the required power.

Besides, the thermostat and the piston valve device are assumed to be so made that, when the mixing valve is out of function (the cold water as well as the hot water supply is shut off), the piston valve will take up the position shown in Fig. 4 with the cold water entrance unblocked.

If now mixed water at a temperature of for instance 40° C. be desired, the pointer 60 is set at the corresponding graduation on the lid causing an increase of the volume of the chamber 39, if the pointer has been before set at a lower figure. Cold and hot water is admitted and enters in the manner above described into the mixing compartment at a temperature, which, due to the valve position, at first will be below that desired. By the increased volume of the chamber 39, part of the liquid is forced from the bellows 38, into the said chamber, the piston valve 15 being thereby moved in the direction towards an increased hot water supply by the action of the spring 37. When the mixing temperature then has reached the desired value, the piston valve will maintain a position corresponding thereto. If for any reason, the temperature of the hot water should drop, also the temperature of the mixed water will drop momentarily. This, however, causes a quick contraction of the regulating liquid in the thermostat and consequently (through the spring 37) a displacement of the piston valve in the direction towards an increased hot water supply and simultaneously a decreased cold water supply. If for instance the temperature of the hot water should happen to be just 40 C. and the pointer 60 is set for the same temperature, the cold water supply would be wholly blocked.

If on the other hand for any reason the temperature of the hot water should rise, an expansion of the regulating liquid takes place and the piston valve will be adjusted towards an increaed cold water supply.

However, the temperature of the mixed water is wholly dependent on the position of the bellows 40 (the volume of the chamber 39) and each position of the said bellows corresponds to a certain fixed temperature.

If for instance a lower mixing temperature be desired, the volume of the chamber 39 is decreased by a corresponding adjustment of the bellows 40 causing an increase of the pressure on the bellows 38 and consequently a displacement of the piston valve in the direction towards an increased cold water supply and a decreased hot water supply.

In order to avoid the risk of bursting the thermostat at such an adjustment from a higher to a lower temperature the spring 44 applies a yielding pressure to the bellows 40, so that a too sudden or powerful increase of pressure will be compensated.

Due to the provision of the thermostat chamber formed by the pipes 4—7 and also due to the high coefficient of expansion of the liquid in this chamber, this part of the thermostat will react quickly to any change of the temperature of the mixed water. On the other hand, the high viscosity of the liquid in the chambers 62 and 39 will tend to dampen the movements of the piston valve 15, when liquid flows between the chambers 39 and 62, so that oscillations thereof will be prevented and the valve will quickly come to rest in a position corresponding to the selected temperature of the mixed water in the chamber 34. This desirable damping of the movements of the valve 15 will also be aided by the throttling effect of the small area of the opening between the chambers 39 and 62. As long as there is no considerable change in the temperatures of the hot and cold water supplied to the mixing valve, the valve 65 remains closed and any passage of liquid between the two chambers 39 and 62 takes place through the narrow opening 66. If, on the other hand, there is a sudden increase of the pressure or the temperature of the hot water supplied to the mixing valve, then it is desirable that the hot water supply should be quickly shut off or restricted in order to prevent scalding. In such a case the valve 65 opens and allows a rapid passage of liquid from the chamber 39 to the chamber 62, so that the valve 15 is moved to the left in Fig. 5 and restricts the hot water supply as well as increases the cold water supply to the mixing chamber. The valve 65 will not allow a rapid flow in the other direction, but this is less important.

Experience has shown that the two liquids, even if one is lubricating oil and the other is kerosene, do not mix to any considerable extent, owing to the fact that the cross-section of the pipes where they meet is very small.

What I claim as new and desire to secure by Letters Patent of the United States, is:

1. A thermostat for operating a control member for a mixing valve, comprising an expansible and contractible chamber, an operating member displaceable in accordance with the expansion and contraction of said chamber and connected to said control member, a second chamber in permanent communication with said first mentioned chamber through a narrow opening, a valve controlled opening for fluid passage only in the direction from the second chamber to the first chamber, a manually operable member in said second chamber for varying the volume thereof, said two chambers being filled with a liquid having a high viscosity, said narrow opening acting to restrict the flow of liquid between the chambers and, in conjunction with the high viscosity of said liquid, to dampen the movements of the first chamber, and a thermo-sensitive member in operative connection with the liquid in said second chamber to vary the pressure thereof according to changes of temperature.

2. A thermostat for operating a control member for a mixing valve, comprising an expansible and contractible chamber, an operating member displaceable in accordance with the expansion and contraction of said chamber and connected to said control member, a second chamber in permanent communication with said first mentioned chamber through a narrow opening, a valve controlled opening for fluid passage only in the direction from the second to the first chamber, a manually operable member in said second chamber for varying the volume thereof, a closed pipe system including a plurality of narrow pipes in communication with said second chamber, said two chambers and part of the pipe system at the connection thereof with the second chamber being filled with a fluid having a high viscosity, the remaining part of the pipe system containing a thermo-sensitive liquid, the said narrow opening between the two chambers acting to restrict the flow of said fluid between the two chambers and, in conjunction with the high viscosity of said fluid, to dampen the movement of the first chamber.

3. A thermostat for operating a control member for a mixing valve, comprising an expansible and contractible chamber, an operating member displaceable in accordance with the expansion and contraction of said chamber and connected to said control member, a second chamber in communication with said first mentioned chamber through an opening constituting a valve seat, a spring loaded valve coacting with said seat and opening only in the direction from the second to the first chamber, a channel in said valve seat providing a permanent opening between the two chambers, a manually operable member in said second chamber for varying the volume thereof, said chambers being filled with a liquid having a high viscosity, said channel in the valve seat acting to restrict the flow of said liquid between the two chambers and, in conjunction with the high viscosity of said liquid, to dampen the movement of the first chamber, and a thermo-sensitive member in operative connection with the liquid in said second chamber to vary the pressure thereof according to changes of temperature.

4. A thermostat for operating a control member for a mixing valve, comprising an expansible and contractible chamber, an operating member displaceable in accordance with the expansion and contraction of said chamber and connected to said control member, a second chamber in permanent communication with said first mentioned chamber through an opening constituting a valve seat, a spring loaded valve coacting with said seat and opening only in the direction from the second to the first chamber, a channel in said valve seat providing a permanent opening between the two chambers, a manually operable member in said second chamber for varying the volume thereof, and a closed pipe system including a plurality of narrow pipes in communication with said second chamber, said two chambers and part of the pipe system at the connection thereof with the second chamber being filled with a liquid having a high viscosity, the remaining part of the pipe system containing a thermo-sensitive liquid, the said channel in the valve seat acting to restrict the flow of high viscosity liquid between the two chambers and, in conjunction with the high viscosity, the first liquid to dampen the movement of the first chamber.

JOHN FRITJOF HULTMAN.